US009146104B2

(12) United States Patent
Smith et al.

(10) Patent No.: US 9,146,104 B2
(45) Date of Patent: Sep. 29, 2015

(54) JELLYFISH-INSPIRED TILT SENSOR AND ARTIFICIAL MESOGLEA

(71) Applicant: Virginia Tech Intellectual Properties, Inc., Blacksburg, VA (US)

(72) Inventors: Colin Smith, Reston, VA (US); Shashank Priya, Blacksburg, VA (US)

(73) Assignee: Virgina Tech Intellectual Properties, Inc., Blacksburg, VA (US)

( * ) Notice: Subject to any disclaimer, the term of this patent is extended or adjusted under 35 U.S.C. 154(b) by 194 days.

(21) Appl. No.: 13/731,378

(22) Filed: Dec. 31, 2012

(65) Prior Publication Data

US 2014/0187681 A1 Jul. 3, 2014

(51) Int. Cl.
*G01C 9/10* (2006.01)
*G01C 9/06* (2006.01)

(52) U.S. Cl.
CPC ............ *G01C 9/10* (2013.01); *G01C 2009/068* (2013.01); *G01C 2009/107* (2013.01)

(58) Field of Classification Search
CPC .................................... G01C 9/10; G01C 9/06
USPC .................... 33/366, 23, 366.24, 391, 366.23
See application file for complete search history.

(56) References Cited

U.S. PATENT DOCUMENTS

| | | | | |
|---|---|---|---|---|
| 4,972,595 A | * | 11/1990 | Shimamura et al. | 33/366.23 |
| 5,042,158 A | * | 8/1991 | Schmelzer | 33/366.18 |
| 5,365,671 A | * | 11/1994 | Yaniger | 33/366.12 |
| 5,373,153 A | * | 12/1994 | Cumberledge et al. | 33/366.23 |
| 5,625,955 A | * | 5/1997 | Han | 33/366.15 |
| 5,669,147 A | * | 9/1997 | Nakajima et al. | 33/334 |
| 5,955,713 A | * | 9/1999 | Titus et al. | 33/366.11 |
| 6,148,669 A | * | 11/2000 | Roest | 33/366.25 |
| 6,472,864 B1 | * | 10/2002 | Emo et al. | 33/366.11 |
| 6,664,534 B2 | * | 12/2003 | Hjertman et al. | 33/366.23 |
| 6,708,416 B1 | * | 3/2004 | Havens et al. | 33/366.24 |
| 7,975,394 B2 | * | 7/2011 | Mollmer et al. | 33/366.23 |
| 2001/0045019 A1 | * | 11/2001 | Takeuchi et al. | 33/366.19 |
| 2006/0168833 A1 | * | 8/2006 | Fulks et al. | 33/366.24 |
| 2010/0101103 A1 | * | 4/2010 | Horio et al. | 33/366.23 |
| 2011/0041350 A1 | * | 2/2011 | Makimura | 33/366.23 |
| 2011/0072674 A1 | * | 3/2011 | Lai | 33/366.23 |
| 2014/0187681 A1 | * | 7/2014 | Smith et al. | 33/366.25 |

OTHER PUBLICATIONS

Yokoyama F, 1986, Morphology and structure of highly elastic poly-(vinyl alcohol) hydrogel prepared by repeated freezing-and-melting. Colloid and Polymer Science. 264(7):595-601.
Bhushan B, Koch K and Jung Y C (2008) Biomimetic hierarchical structure for self-cleaning Appl. Phys. Lett. 93 093101, DOI:10. 1063/1.2976635.
Billat S, Glosch H, Kunze M, Hedrich F, Frech J, Lang W (2002) Micromachined inclinometer with high sensitivity and very good stability. Sens. Actuators, vol. A 3211 pp. 1-6.

(Continued)

*Primary Examiner* — Yaritza Guadalupe-McCall
(74) *Attorney, Agent, or Firm* — Blank Rome LLP

(57) ABSTRACT

Components of an unmanned undersea vehicle are inspired by jellyfish that uses its flexible body and tilt sensing to achieve efficient swimming and turning. A tilt sensor, based on a statocyst, has a metal ball in a chamber lined with resistors. The tilt is sensed in accordance with which resistors the ball contacts. A composition of polyvinyl alcohol hydrogel with ferritin particles dispersed therein mimics the qualities of a jellyfish's mesoglea.

16 Claims, 7 Drawing Sheets

(56) References Cited

OTHER PUBLICATIONS

Constandinou T G, and Georgiou J 2008 Micro-Optoelectromechanical Tilt Sensor, Journal of Sensors vol. 2008, Article ID 782764, 1-7.
Cook S (2010) New Zealand Coastal Marine Invertebrates Christchurch: Canterbury University Press pp. 229-230.
Gust D, Moore T A and Moore A L (2001) Mimicking Photosynthetic Solar Energy Transduction Acc. Chem. Res. 34 40-48, DOI:10.1021/ar9801301.
Huber Generic R (2007). Creative Commons <http://en.wikipedia.org/wiki/Creative_Commons_license> Attribution-Share Alike 2.5 Generic <http://creativecommons.org/licenses/by-sa/2.5/>.
Horridge G A (1969) Statocysts of medusae and evolution of stereocilia, Tissue Cell 1 341-353.
Jung H, Kim C J, and Kong S H 2007 An optimized MEMS-based electrolytic tilt sensor Sensors and Actuators A 139 23-30.
Lazaris A, Arcidiacono S, Huang Y, Zhou J, Duguay F, Chretien N, Welsh E A, Soares J W and Karatzas C N (2002) Spider Silk Fibers Spun from Soluble Recombinant Silk Produced in Mammalian Cells Science 295 472-476, DOI:10.1126/science. 1065780.
Lee H, Lee B P and Messersmith P B (2007) A reversible wet/dry adhesive inspired by mussels and geckos Nature 448 338-341, DOI:10.1038/nature05968.
Menciassi A and Dario P (2003) Bio-inspired solutions for locomotion in the gastrointestinal tract: background and perspectives Phil. Trans. R. Soc. Lond. A 361 2287-2298, DOI:10.1098/rsta.2003.1255.
Omori M and Kitamura M (2004) Taxonomic review of three Japanese species of edible jellyfish (Scyphozoa: Rhizostomeae) Plankton Biol. Ecol. 51 36-51.
Seibel B A and Drazen J C (2007) The rate of metabolism in marine animals: environmental constraints, ecological demands and energetic opportunities Phil. Trans. R. Soc. B 362 2061-2078, DOI:10.1098/rstb.2007.2101.
Sötje I, Neues F, Epple M, Ludwig W, Rack A, Gordon M, Boese R, and Tiemann H (2011) Comparison of the statilith structures of *Chironex fleckeri* (Cnidaria, Cubozoa) and *Periphylla periphylla* (Cnidaria, Scyphozoa): a phylogenetic approach, Marine Biology 158 1149-1161.
Tang L, Zhang K, Chen S, Zhang G, and Liu G 2009 MEMS inclinometer based on a novel piezoresistor structure Microelectronics Journal 40 78-82.
Tautz J and Sandeman D C (1980) The detection of waterborne vibration by sensory hairs on the chelae of the crayfish, J. Exp. Biol. 88 351-356.
Trask R S, Williams H R and Bond I P (2007) Self-healing polymer composites: mimicking nature to enhance performance Bioinspir. Biomim. 2 P1, DOI:10.1088/1749-3182/2/1/P01.
Villanueva A, Smith C and Priya S (2011) A biomimetic robotic jellyfish (Robojelly) actuated by shape memory alloy Bioinspir. Biomim. 6 036004 DOI:10.1088/1748-3182/6/3/036004.
Wiese K (1976) Mechanoreceptors for near-field displacements in crayfish, J. Neurophysiol. 39 816-833.
Williamson R (1988) Vibration sensitivity in the statocyst of the northern octopus, *Eledone cirrosa*, J. Exp. Biol. 134 451-454.
Yasrebi M, Kim G H, Gunnison K E, Milius D L, Sarikaya M and Aksay I A (1990) Biomimetic processing of ceramics and ceramic-metal composites Better Ceramics through Chemistry IV 180 625-635.
Villanueva AM, Joshi KB, Blottman JB and Priya S, 2010, A bio-inspired shape memory alloy composite (BISMAC) actuator Smart Mater. Struct. 19 025013.

ASTM Standard D575-91, 2010, Standard Test Methods for Rubber Properties in Compression. ASTM International, West Conshohocken, PA, 2007, DOI: 10.1520/D0575-91R07, www.astm.org <http://www.astm.org>.
Wang H, Brown H, 2011, Jellyfish gel and its hybrid hydrogels with high mechanical strength. Soft matter. 7(1):211-219.
Chapman G, 1953, Studies of the Mesogloea of Coelenterates: I. Histology and Chemical Properties. Quarterly Journal of Microscopical Science. s3-94 (26): 155-176.
Dabiri J O, Colin SP, and Costello J H., 2006, Fast-swimming jellyfish exploit velar kinematics to form an optimal vortex wake. J. Exp. Biol. 209, 2025-2033.
Gladfelter W G, 1972, Structure and function of the locomotory system of *Polyorchis montereyensis* (Cnidaria, Hydrozoa) Helgol. Wiss. Meeresunters. 23 38-79.
Hermansson AA, Ologsson P, Ekstedt S, Pihl M, Gatenholm P., 2010, Marine-inspired water-structured biomaterials. New York: Wiley-Blackwell. Chapter 28 from Water Properties in Food, Health, Pharmaceutical and Biological Systems. DOI: 10.1002/9780470958193.ch28.
Hsu L, Weder C and Rowan S J, 2011, Stimuli-responsive, mechanically-adaptive polymer nanocomposites. J. Mater. Chem., 21, 2812-2822. DOI: 10.1039/c0jm02383c.
Hyon S H, Cha W I, Ikada Y., 1989, Preparation of transparent poly (vinyl alcohol) hydrogel. Polymer Bulletin., 22 (2):119-122.
Joshi K B, Villanueva A, Smith C F and Priya S, 2011, Modeling of Artificial *Aurelia aurita* Bell Deformation. Marine Technology Society Journal., 45 (4): 165-180.
Kumar M, Varshney L, Francis S., 2005, Radiolytic formation of Ag clusters in aqueous polyvinyl alcohol solution and hydrogel matrix. Radiation Physics and Chemistry 73. 21-27. doi:10.1016/j.radphyschem.2004.06.006.
Lowndes A G, 1942, Percentage of Water in Jelly-Fish. Nature, 150, 234-235.
Mandelkern L, 1967, The effect of molecular weight on the crytallization and melting of long-chain molecules. Journal of Polymer Science, Part C (Polymer Symposium). (18):51-55.
Mansur H S, Orefice R L, Mansur A A P, 2004, Characterization of poly(vinyl alcohol)/poly(ethylene glycol) hydrogels and PVA-derived hybrids by small-angle X-ray scattering and FTIR spectroscopy. Polymer 45 7193-7202.
Megill W M, 2002, The biomechanics of jelly?sh swimming, Ph.D. Dissertation, Department of Zoology, University of British Columbia, 116.
Miyazaki T, Yamaoka K, Gong JP, Osada Y, 2002, Hydrogels with crystalline or liquid crystalline structure. Macromolecular rapid communications. 23(8):447-455.
Ohara K, Yamashita I, Yaegashi T, Moniwa M, Yoshimaru M, Uraoka Y, 2009, Floating Gate Memory with Biomineralized Nanodots Embedded in High-k Gate Dielectric. Applied physics express. 2(9):095001.
Park K, Shalabay WS, Park H, 1993, Biodegradable hydrogels for drug delivery. Lancaster, Pennsylvania: Technomic Publishing Company, Inc.
Peppas N A, Stauffer S R, 1991, Reinforced Uncrosslinked Poly (vinyl alcohol) Gels Produced by Cyclic Freezing-Thawing Processes: a Short Review. Journal of Controlled Release. (3):305-310.
Shin MK, Spinks GM, Shin SR, Kim SI, and Kim SJ, 2009, Nanocomposite Hydrogel with High Toughness for Bioactuators. Advanced Materials. 21, 1712-1715.
Shin MK, Kim SI, Kim SJ, 2008, Controlled magnetic nanofiber hydrogels by clustering ferritin. Langmuir, 24, 12107-12111.

* cited by examiner

Figure 6A
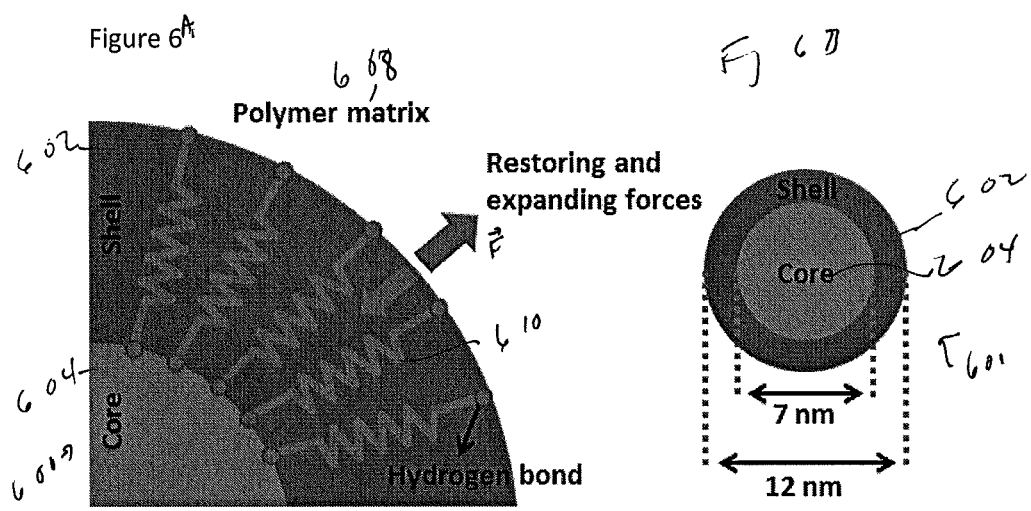
Figure 6B
Figure 7
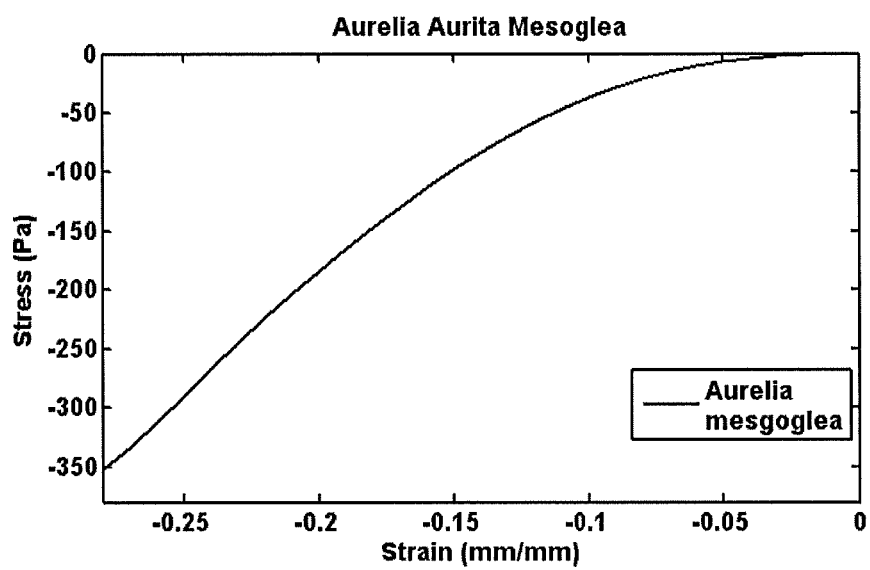

JELLYFISH-INSPIRED TILT SENSOR AND ARTIFICIAL MESOGLEA

STATEMENT OF GOVERNMENT INTEREST

This invention was made with government support under Contract No. N00014-08-1-0654 awarded by Office of Naval Research. The government has certain rights in the invention.

FIELD OF THE INVENTION

The present invention is directed to a tilt sensor and a material and more specifically to such a tilt sensor and viscoelastic material that offer improvements inspired by the tilt sensor and mesoglea of a jellyfish.

DESCRIPTION OF RELATED ART

Many tilt sensors have been developed over the years using a variety of macro and micro patterning methods combined with top-down assembly. Recently, micro electromechanical systems (MEMS) technology has been applied towards fabrication of tilt sensors that have opened the pathway for many different inclinometer technologies. Constandinou and Georgiou (2008) demonstrated a sensor composed of one stationary and one moving part. The moving semicircular mass projects a shadow onto an array of optical sensors. The sensor had a five-degree resolution and up to three hundred total degrees of tilt. Jung et al. (2007) described an electrolytic version with a MEMS micromachined cavity and a moving electrolyte. The degree of tilt determined how much of the solution contacts the electrodes producing a varying electrical signal. Tang et al. (2009) produced a structure that responds directly to gravity through the bending of extremely small piezoelectric beams. The sensor was able to achieve 0.025 mV per degree sensitivity. A novel device has been proposed that had a single MEMS heater with a silicon bridge to sense the temperature by resistance changes on either side (Billat et al. 2002). Due to free convective flow, when the tilt of the sensor changes, so does the temperature felt by each silicon bridge thermometer (Billat et al. 2002). However, all those artificial technologies ignore the fact that nature has already developed elegant tilt sensors which are used daily by aquatic animals.

In a separate field of endeavor, bio-inspired materials and systems research have received significant attention in the last decade. Some examples that demonstrate desired functions and structures are self-cleaning (Bhushan et al. 2008), solar energy harvesting by replicating photosynthesis (Gust et al. 2001), strong adhesives (Lee et al. 2007) and silk, including technology for fiber spinning (Lazaris et al. 2002), rapid locomotion in hard to reach places (Menciassi and Dario 2003), hard ceramics for armors (Yasrebi et al. 1990), and self-healing characteristics of the bones and tissue (Trask et al. 2007). Those examples reflect upon the possibilities of achieving improved engineering functions by mimicking fundamental mechanisms adopted by nature. Jellyfish are attractive candidates for developing unmanned undersea vehicles (UUV's) due to attributes such as their ability to consume little energy owing to a lower metabolic rate than other marine species (Seibel and Drazen 2007), survivability in varying water conditions, and possession of adequate morphology for carrying payload such as large bell and trailing tentacles and oral arms. Jellyfish inhabit every major oceanic area of the world (Cook 2010) and are capable of withstanding a wide range of temperatures and salinities (Arai 1997). Most species are found in shallow coastal waters, but some have been found in depths of 7,000 meters (Kramp 1959). Furthermore, jellyfish encompass a wide variety of sizes, ranging from a few millimeters to over 2 meters in diameter (Omori and Kitamura 2004), as well as display a multitude of shapes and colors. They have the ability to move vertically but depend mainly upon ocean currents for horizontal movement (Cook 2010). Jellyfish (Cnidarians) have no central nervous system (CNS) and only use a diffused nerve net to control movement. As such, it is important for them to have sensory organs that can provide information to the nerve net and affect behaviors such as feeding, mating, and predator evasion. For instance, most jellyfish have simple light-sensors called ocelli. When that sensor sees changes in light intensity, the nerve net is programmed to assume that a predator has just passed over the jellyfish, initiating an escape mechanism. Similarly, it possesses an inclinometer, the statocyst organ, which can detect pitch or roll. In the center of a ring of cells, a statolith (mineralized ball) pushes against small sensing hairs called setae. That pressure creates a feedback for change in orientation and helps in maintaining balance (Arai 1997). The statocyst feeds information into the outer nerve ring, which is responsible for collecting sensory data. The inner nerve ring then incorporates sensory input and produces asymmetric contractions of the subumbrellar swimming muscles, allowing the animal to turn. Pacemakers generate swimming gates such as swimming vertically, turning and hovering. Horridge (Horridge 1969) has pointed out that it is important for the gravity sensing organ to move in conjunction with the vibration sensory mechanism to localize the information. In medusae and other lower invertebrates, the sensory role is served by motile or non-motile cilia which act as vibration receptors and their response in coupled with the sense of direction of gravity through statocyst.

FIGS. 1A and 1B show the SEM images of the natural jellyfish statolith taken from an *Aurelia aurita* sample that was acquired from the New England Aquarium. More specifically, FIG. 1A is a microscope image of a statocyst within a rhopalia structure, and FIG. 1B shows an SEM close-up view of natural statolith ball. The adult animal, 2.8 cm in diameter, was dissected to retrieve a statocyst. That was done by first locating one of the eight rhopelia located sequentially along the bell margin. A rhopelia was then opened and the statocyst was removed. The sample was characterized using scanning electron microscopy (SEM). That was performed with a LEO (Zeiss) 1550 high-performance Schottky field-emission SEM (FESEM) capable of resolution in 2-5 nm size range. FIG. 1A shows an image of the statocyst, and FIG. 1B shows the magnified view of the statoliths. The number and geometry of statolith is dependent upon the given species, and it is primarily made from bismuth or calcium carbonate. The *A. aurita* statoliths analyzed were made of calcium sulfate dihydrate and are primarily of spherical geometry as opposed to cubic, rectangular and other geometries found in different species. The statolith has a rough surface caused by dispersed sodium chloride crystal formation. More than 100 statoliths were found per statocyst, ranging from 10 to 20 μm in diameter. Those findings are consistent with the data reported in literature. Sötje et al. have investigated the structure of statoliths in *Periphylla periphylla* (Cnidaria, Scyphozoa) and *Chironex fleckeri* (Cnidaria, Cubozoa) (Sötje et al. 2011). In the case of *P. periphylla* the statocyst had a width of 110 μm, which increased with increasing medusa diameter according to the relationship ($60.691 \times$(diameter in mm)$^{0.538}$ μm). The number of statoliths per statocyst also increased with increasing medusa coronal diameter, following the relationship ($5.494 \times$(diameter in mm)$^{1.379}$). Accordingly, for a diameter of 30 mm, the statocyst width will be ~378 μm, and the number of statoliths per statocyst will be ~600. The relationship between the mean width of statoliths per statocyst (in μm) and medusa coronal diameter was found to be 5.394 ln(diameter in mm)+19.673. Thus, for diameter of 30 mm, the mean width can be calculated to be ~38 μm. Detailed X-ray diffraction analysis was conducted on the statolith of *C. fleckeri*, which was shown to have the composition of calcium suplhate hemihydrate (bassanite) with crystal parameters given as: space group—P $3_1 21$, a=6.952 Å, b=6.952 Å, c=6.352 Å, α=β=90°, γ=120°. The investigated crystal had a plate shape with λ=0.711 Å (Sötje et al. 2011). It was noted in the study that the structure of the statolith is not continuous, as it is composed of several oligocrystals.

Sensitivity experiments on the statocysts of medusae are limited and not quantitative in nature. However, an estimation of the sensitivity can be made from the experiments conducted on the other aquatic invertebrates. Williamson (Williamson 1988) has conducted experiments on the vibration sensitivity in the statocyst of the northern octopus, *Eledone cirrosa*. The results showed that octopus statocyst has vibration sensitivity corresponding to particle displacement of 0.12 μm. That was found to compare well with sensitivity of hair sensors in crayfish *Cherax destructor* (~0.6 μm) and *Procambarus clarkia* (~0.1 μm) (Williamson 1988; Tautz and Sandeman 1980; Wiese 1976). Further, Williamson showed that *E. cirrosa* exhibited peak sensitivity in the frequency range of 70-100 Hz and the most sensitive unit responded at a stimulus velocity of 60 μm/s. Those results do not provide the angular sensitivity but they do provide us some comparative linear sensitivity that can be used as a metric in the design of artificial sensitivity.

In another separate field of endeavor, unmanned underwater vehicles (UUVs) have long been in use, but increasingly there has been impetus on developing biomimetic robots that can surpass the performance and functions of traditional vehicles. For example, a robotic jellyfish, inspired by the species *Aurelia aurita* was recently developed and characterized by our group (Villanueva et al.). Many of the soft robots, including the jellyfish robot, being developed to date utilize standard engineering materials such as room temperature vulcanization (RTV) silicone to develop the body of the UUVs. RTV silicone is a good choice due to low cost and the easy availability of a wide range of silicones. However, RTV silicones are not neutrally buoyant, are hydrophobic, and are too stiff to appropriately mimic the dynamic elastic properties of biological materials. There is a critical need for creating an artificial gel that can mimic the mechanical characteristics of soft flexible material such as jellyfish mesoglea. Deployment of biomimetic mesoglea instead of RTV silicone for a robot body may significantly reduce the actuating force and therefore power requirement of the vehicle. Multiple types of mesoglea exist within a given natural species: bell and joint, subumbrellar and exumbrellar.

Mesoglea makes up a majority of jellyfish volume (Arai 1997). It also provides structural support and helps in tailoring the kinematics of the animal. Mesoglea serves as the main locomotor surface such as the wing skin of a bat or the mantle of a squid. In achieving that additional functionality, it is evident that the mechanical properties of mesoglea should play a special role. Thus, we have been putting efforts towards understanding the dual role of mesoglea serving as both the structural and locomotor element. Mesoglea is a jelly-like substance comprising long 20-50 nm diameter collagen fibers and a network of proteins and polysaccharides which span the space between the collagen fibers (Wang et al. 2011). It is found in the taxa Cnidaria and Ctenophora, but for the purposes of the present invention, we are primarily concerned with the jellyfish represented in the classes Hydrozoa, Scyphozoa, Cubozoa, and Staurozoa. The collagen fibers form a network which varies from one species to another. Chapman (1953) has suggested that that network in *Aurelia aurita* is dense and random. It has interlinks with some cells interspersed in the mesoglea between the fibers. The collagen fibers for *Cyanea capillata* are sparse, without many interlinks and still random. *Chrysoara* species have relatively oriented and branched fibers. Collagen fibers provide the mesoglea with a large fraction of its elasticity, and their arrangement determines the stiffness and other material properties of different parts of the jellyfish bell. The presence of a varying collagen fiber network is the reason for jellyfish mesoglea exhibiting quite different elastic properties. Collagen fibers are made of α chains of proteins. Polysaccharides and proteins act as food storage which is consumed by jellyfish during starvation. Mesoglea also has mucoprotein which takes part in digestion of food. Jellyfish mesoglea can be transparent, highly hydrophilic, neutrally buoyant, and possess low modulus while retaining durability (Arai 1997). Those properties are partly due to the fact that mesoglea has such high water content, more than 96% (Lowndes 1942).

The mechanical properties of mesoglea have scarcely been investigated. An attempt was made by Alexander (1964) who studied viscoelastic properties of mesoglea and concluded that jellyfish (Scyphozoa, *Cyanea* and *Chrysaora*) mesoglea was softer than that of previously studied sea anemones (Anthozoa). Under deformation tests, mesoglea showed large instantaneous strain and then a slow extension for long times (~10 hr) before reaching a near-saturated state. That is in sharp contrast to the body wall of sea anemones, which have a very narrow distribution of retardation times. Gladfelter (1972) has investigated the bell mesoglea of *Polyorchis montereyensis* as a rigid gel and the joint mesoglea as a much softer deformable gel that does not have viscoelastic properties. Demont and Gosline (1998) found that intact jellyfish bell of the species *Polyorchis penicillatus* has modulus between 400 and 1000 Pa. Megill (2005) found the stiffness of *Polyorchis penicillatus* bell mesoglea to be 350 Pa in compression, while the softer joint mesoglea had stiffness of 50 Pa. Wang et al. (2011) investigated the mechanical properties of the jellyfish *Rhopilema esculenta Kishinouye* but did not report a single stiffness value. Many of those prior studies indicate that the modulus of mesoglea varies over a wide range of magnitude. That could be associated with the measurement technique and also with the method of sample preparation. It is well known that rapid changes in the properties of mesoglea occur as a function of time after it has been detached from the real animal.

In yet another separate field of endeavor, much work has been done on synthetic hydrogels for a variety of purposes as diverse as tissue engineering (Shin 2008), superabsorbent polymers (Hermansson 2010), and gold ion reclamation into nanoparticles (Kumar 2005). That class of material is highly tunable by way of nanofillers and can be synthesized in many ways, including freeze-thaw, radiation, and chemical crosslinking agents. Hydrogels are an aqueous gel network composed typically of a hydrophilic polymer, cross-linked either by chemical bonds or cohesion forces. When placed in water, hydrogels are able to swell rapidly and retain large volumes of water without dissolving. Despite high water contents, hydrogels are elastic solids that exhibit memory, a state to which the system can return after being deformed (Park et al. 1993). Conventional hydrogels are usually mechanically weak due to their lack of ordered structure at the molecular level (Miyazaki et al. 2002). However, recently there has been increasing interest in hydrogels with high mechanical strength and novel microstructures have been developed to achieve that aspect (Kopecek et al. 1986). Wang et al. (2011) have developed hybrid hydrogels based upon the mesoglea structure of the jellyfish *Rhopilema esculenta Kishinouye* but with the intent of achieving higher mechanical strength than other synthetic hydrogels.

The following provide background information related to the tilt sensor:

Arai M N (1997) A Functional Biology of Scyphozoa London: Chapman & Hall

Bhushan B, Koch K and Jung Y C (2008) Biomimetic hierarchical structure for self-cleaning Appl. Phys. Lett. 93 093101, DOI:10.1063/1.2976635

Billat S, Glosch H, Kunze M, Hedrich F, Frech J, Lang W (2002) Micromachined inclinometer with high sensitivity and very good stability. *Sens. Actuators*, Vol. A 3211 pp. 1-6.

Constandinou T G, and Georgiou J 2008 Micro-Optoelectromechanical Tilt Sensor, Journal of Sensors Volume 2008, Article ID 782764, 1-7

Cook S (2010) New Zealand Coastal Marine Invertebrates Christchurch: Canterbury University Press pp 229-230

Gust D, Moore T A and Moore A L (2001) Mimicking Photosynthetic Solar Energy Transduction Acc. Chem. Res. 34 40-48, DOI:10.1021/ar9801301

Huber R (2007). Creative Commons Attribution-Share Alike 2.5 Generic

Horridge G A (1969) Statocysts of medusae and evolution of stereocilia, Tissue Cell 1 341-353.

Jung H, Kim C J, and Kong S H 2007 An optimized MEMS-based electrolytic tilt sensor Sensors and Actuators A 139 23-30

Kramp P L (1959) *Stephanoscyphus* (Scyphozoa) Galatea Report 1 173-185

Lazaris A, Arcidiacono S, Huang Y, Zhou J, Duguay F, Chretien N, Welsh E A, Soares J W and Karatzas C N (2002) Spider Silk Fibers Spun from Soluble Recombinant Silk Produced in Mammalian Cells Science 295 472-476, DOI: 10.1126/science.1065780

Lee H, Lee B P and Messersmith P B (2007) A reversible wet/dry adhesive inspired by mussels and geckos Nature 448 338-341, DOI:10.1038/nature05968

Menciassi A and Dario P (2003) Bio-inspired solutions for locomotion in the gastrointestinal tract: background and perspectives Phil. Trans. R. Soc. Lond. A 361 2287-2298, DOI:10.1098/rsta.2003.1255

Omori M and Kitamura M (2004) Taxonomic review of three Japanese species of edible jellyfish (Scyphozoa: Rhizostomeae) Plankton Biol. Ecol. 51 36-51

Seibel B A and Drazen J C (2007) The rate of metabolism in marine animals: environmental constraints, ecological demands and energetic opportunities Phil. Trans. R. Soc. B 362 2061-2078, DOI:10.1098/rstb.2007.2101

Sötje I, Neues F, Epple M, Ludwig W, Rack A, Gordon M, Boese R, and Tiemann H (2011) Comparison of the statilith structures of *Chironex fleckeri* (Cnidaria, Cubozoa) and *Periphylla periphylla* (Cnidaria, Scyphozoa): a phylogenetic approach, Marine Biology 158 1149-1161.

Tang L, Zhang K, Chen S, Zhang G, and Liu G 2009 MEMS inclinometer based on a novel piezoresistor structure Microelectronics Journal 40 78-82

Tautz J and Sandeman D C (1980) The detection of water-borne vibration by sensory hairs on the chelae of the crayfish, J. Exp. Biol. 88 351-356.

Trask R S, Williams H R and Bond I P (2007) Self-healing polymer composites: mimicking nature to enhance performance Bioinspir. Biomim. 2 P1, DOI:10.1088/1748-3182/2/1/P01

Villanueva A, Smith C and Priya S (2011) A biomimetic robotic jellyfish (Robojelly) actuated by shape memory alloy Bioinspir. Biomim. 6 036004 DOI:10.1088/1748-3182/6/3/036004

Wiese K (1976) Mechanoreceptors for near-field displacements in crayfish, J. Neurophysiol. 39 816-833.

Williamson R (1988) Vibration sensitivity in the statocyst of the northern octopus, *Eledone cirrosa*, J. Exp. Biol. 134 451-454.

Yasrebi M, Kim G H, Gunnison K E, Milius D L, Sarikaya M and Aksay I A (1990) Biomimetic processing of ceramics and ceramic-metal composites Better Ceramics through Chemistry IV 180 625-635

The following provide background information related to the artificial mesoglea: Alexander R M, 1964, Visco-elastic properties of the mesoglea of jellyfish. *J. Exp. Biol.*, 41, 363-369

Arai M N, 1997, A Functional Biology of Scyphozoa London: Chapman & Hall

ASTM Standard D575-91, 2010, Standard Test Methods for Rubber Properties in Compression. ASTM International, West Conshohocken, Pa., 2007, DOI: 10.1520/D0575-91R07, www.astm.org.

ASTM Standard D695-10, 2010, Standard Test Methods for Rubber Properties in Compression. ASTM International, West Conshohocken, Pa., 2007, DOI: 10.1520/D0575-91R07, www.astm.org.

Chapman G, 1953, Studies of the Mesogloea of Coelenterates: I. Histology and Chemical Properties. Quarterly Journal of Microscopical Science. s3-94 (26): 155-176

Dabiri J O, Colin S P, and Costello J H., 2006, Fast-swimming jellyfish exploit velar kinematics to form an optimal vortex wake. J. Exp. Biol. 209, 2025-2033

Gladfelter W G, 1972, Structure and function of the locomotory system of *Polyorchis montereyensis* (Cnidaria, Hydrozoa) *Helgol. Wiss. Meeresunters.* 23 38-79

Hermansson A M, Ologsson P, Ekstedt S, Pihl M, Gatenholm P., 2010, Marine-inspired water-structured biomaterials. New York: Wiley-Blackwell. Chapter 28 from Water Properties in *Food, Health*, Pharmaceutical and Biological Systems. DOI: 10.1002/9780470958193.ch28

Hsu L, Weder C and Rowan S J, 2011, Stimuli-responsive, mechanically-adaptive polymer nanocomposites. *J. Mater. Chem.*, 21, 2812-2822. DOI: 10.1039/c0jm02383c Hyon S H, Cha W I, Ikada Y., 1989, Preparation of transparent poly (vinyl alcohol) hydrogel. *Polymer Bulletin.*, 22(2): 119-122.

Joshi K B, Villanueva A, Smith C F and Priya S, 2011, Modeling of Artificial *Aurelia aurita* Bell Deformation. Marine Technology Society Journal., 45 (4): 165-180

Kumar M, Varshney L, Francis S., 2005, Radiolytic formation of Ag clusters in aqueous polyvinyl alcohol solution and hydrogel matrix. *Radiation Physics and Chemistry* 73. 21-27. doi:10.1016/j.radphyschem.2004.06.006

Lowndes A G, 1942, Percentage of Water in Jelly-Fish. Nature, 150, 234-235.

Mandelkern L, 1967, The effect of molecular weight on the crytallization and melting of long-chain molecules. *Journal of Polymer Science*, Part C (Polymer Symposium). (18):51-55.

Mansur H S, Orefice R L, Mansur A A P, 2004, Characterization of poly(vinyl alcohol)/poly(ethylene glycol) hydrogels and PVA-derived hybrids by small-angle X-ray scattering and FTIR spectroscopy. Polymer 45 7193-7202

Megill W M, 2002, The biomechanics of jellyfish swimming, Ph.D. Dissertation, Department of Zoology, University of British Columbia, 116.

Miyazaki T, Yamaoka K, Gong J P, Osada Y, 2002, Hydrogels with crystalline or liquid crystalline structure. Macromolecular rapid communications. 23(8):447-455.

Ohara K, Yamashita I, Yaegashi T, Moniwa M, Yoshimaru M, Uraoka Y, 2009, Floating Gate Memory with Biomineralized Nanodots Embedded in High-k Gate Dielectric. Applied physics express. 2(9):095001.

Park K, Shalabay W S, Park H, 1993, Biodegradable hydrogels for drug delivery. Lancaster, Pa.: Technomic Publishing Company, Inc.

Peppas N A, Stauffer S R, 1991, Reinforced Uncrosslinked Poly (vinyl alcohol) Gels Produced by Cyclic Freezing-Thawing Processes: a Short Review. Journal of Controlled Release. (3):305-310.

Shin M K, Spinks G M, Shin S R, Kim S I, and Kim S J, 2009, Nanocomposite Hydrogel with High Toughness for Bioactuators. Advanced Materials. 21, 1712-1715.

Shin M K, Kim S I, Kim S J, 2008, Controlled magnetic nanofiber hydrogels by clustering ferritin. Langmuir, 24, 12107-12111.

Villanueva A A, Joshi K B, Blottman J B and Priya S, 2010, A bio-inspired shape memory alloy composite (BISMAC) actuator *Smart Mater. Struct.* 19 025013

Wang H, Brown H, 2011, Jellyfish gel and its hybrid hydrogels with high mechanical strength. *Soft matter.* 7(1):211-219.

Wang H, Brown H, 2011, Jellyfish gel and its hybrid hydrogels with high mechanical strength. *Soft matter.* 7(1):211-219.

Yokoyama F, 1986, Morphology and structure of highly elastic poly(vinyl alcohol) hydrogel prepared by repeated freezing-and-melting. *Colloid and Polymer Science.* 264 (7):595-601.

SUMMARY OF THE INVENTION

It is thus an object of the invention to improve the sensitivity of tilt sensors.

It is another object of the invention to design a nanocomposite hydrogel that mimics the mechanical properties of the natural *Aurelia aurita* bell mesoglea.

To achieve the above and other objects, the present invention is directed to a tilt sensor that mimics the operation of a natural statolith. A conductive ball or other object is disposed in a cavity surrounded by resistors or other electrical elements such as capacitors or resonators. The ball contacts a certain one or ones of the electrical element on tilting to create a connection that can be correlated with the magnitude of tilt. In a preferred embodiment, the connection is between a base plate and one or more resistors or other electrical elements.

The present invention is further directed to an artificial mesoglea. Nanofiller composites were found to be a viable option in increasing the strength due to their sustainability. Ferritin was chosen as the candidate for nanofiller composite because of its structural uniformity on the nanoscale. With a protein shell of about 2 to 2.5 nm surrounding a ferritin-iron core of about 7 to 8 nm, the particles can form networks with polymer chains due to the carboxylic acid and the amino groups of ferritin shells. Nanofillers can decelerate crack propagation and delay complete failure of the composite hydrogel. Smaller filler particles increase surface area, which maximizes the interaction between filler and polymer matrix. Ferritin exists naturally in a biocompatible form in various animals, plants, and bacteria for maintaining iron (Shin et. al., 2009; Ohara et. al., 2009). Polymer nanocomposites based upon the ferritin also have the possibility to respond to external stimuli and be mechanically adaptive. Those properties could theoretically allow the body of the jellyfish to change stiffness, diffusion properties, or electrical conductivity (Hsu 2011).

The rowing mechanism used by jellyfish involves sequential contractions of the bell mesoglea. In that case, compressive modulus provides a reasonable metric for characterizing the performance because natural mesoglea is usually under a compressive load during the free-swimming (Dabiri et. al. 2006). Thus, artificial material developed to mimic the mesoglea should have similar compressive modulus.

A single UUV can use one or both of the above-noted aspects of the invention. However, a biomimetic UUV developed by taking into account certain oceanic species will in most practical embodiments use both the above-noted aspects of the invention. The reason for this is simple. Most of the oceanic species maximize the hydrodynamic efficiency by optimizing the body movement with the vortex structure. They also require tilt information to achieve directionality and proper turning. Proper body movement requires flexible material such as that developed in this invention and tilt information can be obtained from the tilt sensor. The combination of the biomimetic sensing technology with flexible artificial structural materials will allow development of superior hydrodynamic vehicles that have similar swimming efficiencies as that found in nature.

BRIEF DESCRIPTION OF THE DRAWINGS

Preferred embodiments of the present invention will be set forth in detail with reference to the drawings, in which:

FIGS. 6A and 6B are diagrams of a ferritin particle usable in the second preferred embodiment of the invention;

FIG. 7 is a stress-strain curve of natural mesoglea;

DETAILED DESCRIPTION OF THE PREFERRED EMBODIMENTS

Figure 1A:
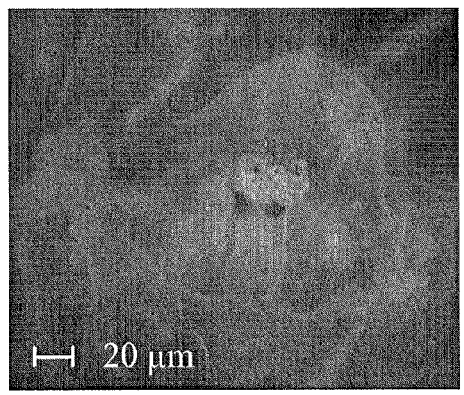
FIGS. 1A and 1B are scanning electron microscope (SEM) images of a natural jellyfish statolith.
Figure 1B:
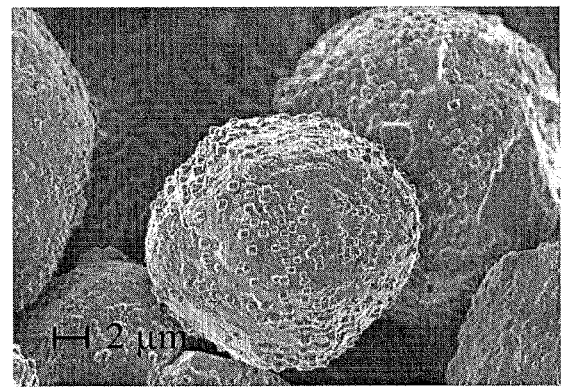

Preferred embodiments of the present invention will be set forth in detail with reference to the drawings, in which like reference numerals refer to like elements or steps throughout.

Figure 2A:
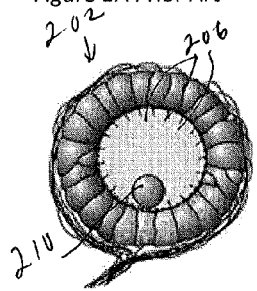
FIGS. 2A-2D are diagrams showing the development of the tilt sensor of the first preferred embodiment of the invention from the natural jellyfish statolith.
Figure 2B:
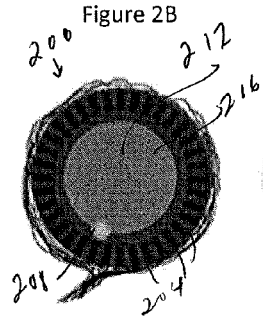
Figure 2C:
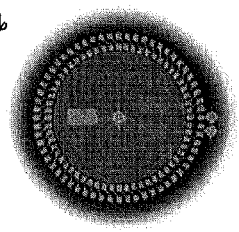
Figure 2D:
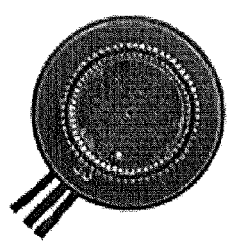

FIGS. 2A and 2B show the design of an artificial statocyst 200 based upon the statocyst 202 identified in the natural animal. Small surface mount resistors 204. (0.012" in width)

were used to mimic the "setae" 206, and a metal ball 208 of 1.55 mm in diameter was used to mimic the "statolith" 210. The statolith ball 208 rolls around inside a circular cavity 212 and contacts the resistors 204, thereby completing the circuit with the base plate 216. Sixty 300 ohm surface mount resistors 204 (Panasonic ERJ-1GEF3000C) were connected in series, as shown in FIGS. 2C and 2D. As the jellyfish tilts, the metal ball rolls and contacts various resistors, and the resistance of the sensor is then measured through the terminals as a voltage divider. The input signal is a small 5V potential. The current drawn would thus be 278 μA, and the power required is 1.389 mW. The output is an analog signal between 0 and 5V which linearly increases with tilt angle. Initially, some readings were unclear due to a thin oxide layer which was built up on the conductive surfaces. A gold coating was added by sputtering to prevent the corrosion as well as increase the conductivity, resulting in a more sensitive and longer lasting sensor. Optimization of the gold coating parameters was conducted by varying the sputtering parameters.

Figure 3:
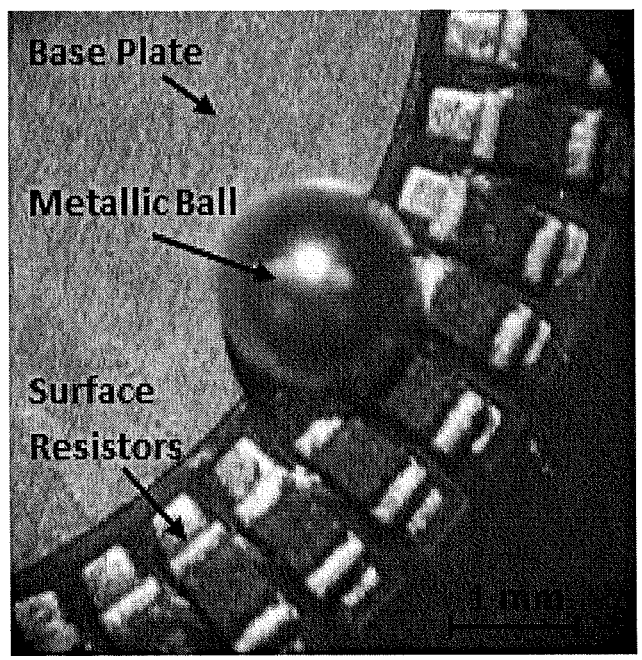
FIG. 3 is a photograph showing a close-up of components of the tilt sensor of FIGS. 2B-2D.

FIG. 3 shows a close-up view of the improved statocyst with gold plating of the metallic ball and base plate. It can also be noted from that figure that the coated surface provides a lower friction surface.

Figure 4A:
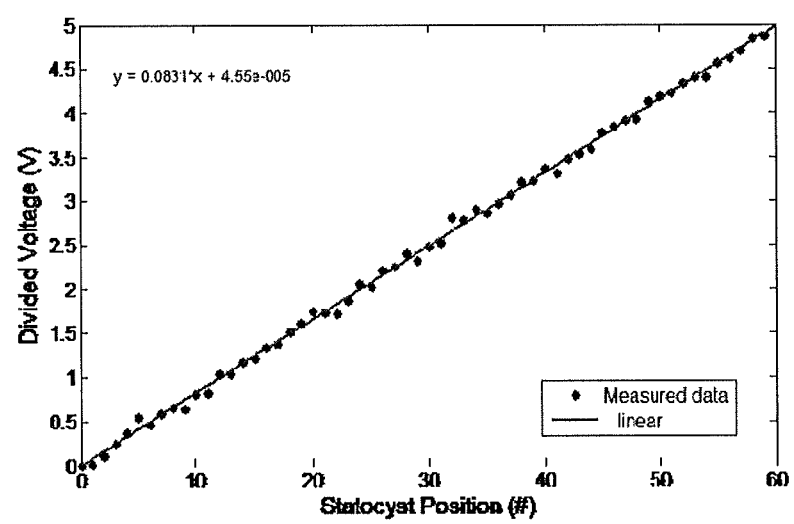
FIGS. 4A-4C are plots of the analog voltage output, sensitivity, and accuracy of the tilt sensor.

The resistance and inclination relationship of the sensor was investigated by measuring resistance for each of the sixty connections individually with a multimeter (Fluke FLU87-5 Digital Multimeter). The analog voltage output was recorded and plotted against resistor number in FIG. 4A. That is a function of the changes in resistor value provided by the manufacturer. The resistor position is measured from the first resistor to the left of the input/output connections clock-wise around the sensor to the $60^{th}$ position immediately to the right of the connectors. It was found that the sensor was quite linear, with a slope magnitude of 0.0831. If the sensor were perfectly linear, the slope should be 0.0833, since we are dividing the 5V signal into 60 individual voltages.

Figure 4B:
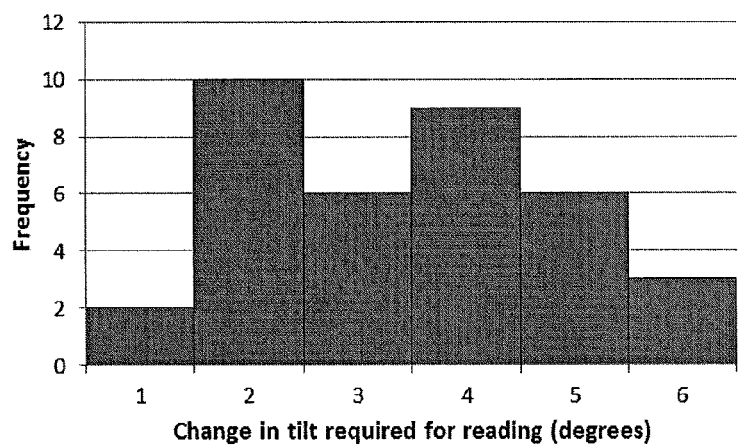
Figure 4C:
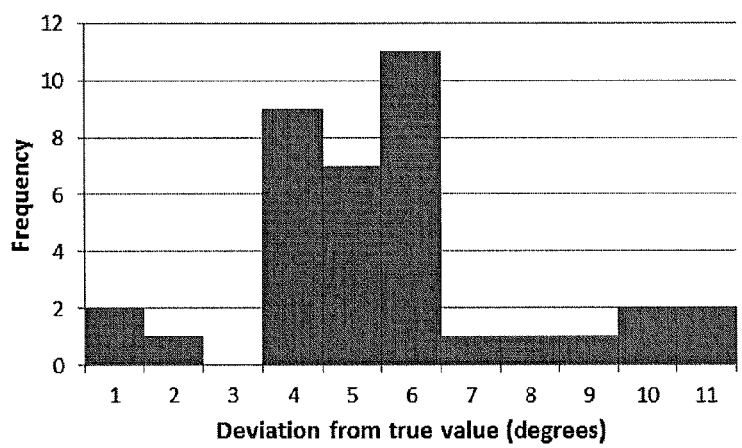

FIGS. 4B and 4C show the sensitivity and accuracy of the sensor respectively. An automatically controlled tilt table was used to incline the sensor. The angle at which the sensor initially responded was recorded as well as the final resting position of the artificial statolith. That test was run 37 times to ensure an even statistical distribution. The frequency refers to the number of test runs where the result matches that on the x-axis. The average angle needed for reading was found to be 4.21 degrees, with a standard deviation of 1.77 degrees, and the average deviation from the true reading was found to be approximately 4.85 degrees, with a high standard deviation of 4.88 degrees. Since each resistor-sensor is equal to 6 degrees, that means that on average the sensor is accurate down to less than one fully resolved physical sensor position. We believe that is a good result given the simplicity in design of the sensor. A comparison with the sensitivity of the natural statocyst cannot be made using that data as the representation here is in terms of angular tilt and dimensions are at least 2 orders of magnitude larger. By using better fabrication techniques, one can incorporate a denser resistor array and multiple balls instead of a single one, which would significantly increase the sensitivity. For example, by using the 3D MEMS fabrication, one can design better architecture for the statolith and the resistors that lowers the contact time.

The artificial statocyst reduces the complexity involved in extracting the tilt angle, as the voltage readings are directly obtained. In comparison, a conventional off-the shelf sensor chip (such as the Honeywell HMC634) needs several intermediate steps before the final output can be obtained. In that case, first the tilt sensing occurs, and data is stored momentarily on the chip. Then the data is transferred through an I2C bus to a converter that allows the computer to use the USB protocol. That COM signal is then run into software such as LabView where the raw data is collected. A LabView VI then stores the data, which can be displayed on the screen in a variety of ways. In comparison, the data from the artificial statocyst can be directly utilized in LabView.

Figure 5A:
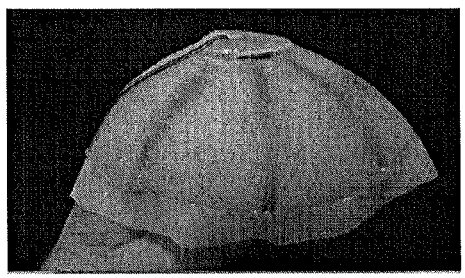
FIGS. 5A-5C are photographs of an artificial jellyfish in which the tilt sensor can be used.
Figure 5B:
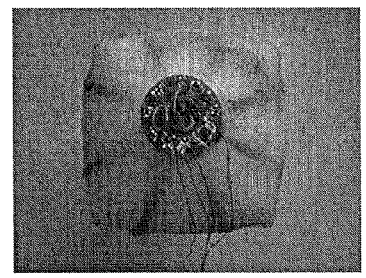

The artificial statocyst was integrated into the Robojelly (Villanueva et al. 2011), as shown in FIG. 5A. The vehicle utilizes eight radially arranged bio-inspired shape memory alloy composite (BISMAC) actuators which mimic the appearance, morphology, and kinematics of the *Aurelia aurita* species. Shape memory alloy actuation was controlled as a function of input current. The vehicle was able to propel itself in static water conditions and achieve a proficiency of 0.19 $s^{-1}$ while the *A. aurita* achieves around 0.25 $s^{-1}$. A circuit was designed (FIG. 5B) to break up the large input signal for all eight BISMAC into individual signals so that different parts of the bell could be controlled independently.

Figure 5C:
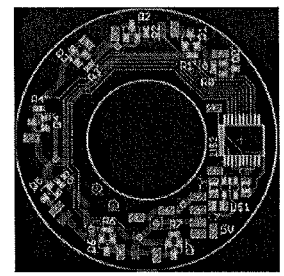

FIG. 5C shows the circuit diagram for the turning signal board as well as the integration of the electronics with the robotic jellyfish prototype. The board was designed in a circular shape to match the natural shape of the jellyfish vehicle. The motion of the actuators was not restricted because the upper portion where the electronics was held has been shown to have negligible deformation. A hole in the center of the circuit board allows wires to pass through for software control and power. When a signal is sent to the board, an $I^2C$ I/O expander chip decodes the commands and parses the signal into eight different individual on/off switches. The switches are electrically controlled by 8 MOSFETs with associated resistors and capacitors. There is also an on-board 5V supply, so that a variety of voltages can be fed into the board. That allows the electronics to use the power feed wires intended for vehicle actuation. The addition of a tilt sensor with individualized actuation will enable directional swimming, which can be programmed with bio-inspired motions such as prey capture and predator avoidance. Those motions and the ability to change direction can also allow the vehicle to perform mission objectives. If solar collection is needed in the future to add to on-board power, the robotic jellyfish can tilt its body to collect the maximum amount of radiant energy from the sun. Thus, the development of an artificial tilt sensor mimicking the form factor and performance of a natural statocyst brings us further closer to replicating *Aurelia aurita*.

In summary, a tilt sensor based on the jellyfish statocyst was designed and characterized. The fabrication process included a procedure followed for printed circuit boards combined with readily available surface mount components. The sensor was found to be highly linear in response. The average tilt angle needed for reading was found to be 4.21, degrees with a standard deviation of 1.77 degrees, and the average deviation from the true reading was found to be approximately 4.85 degrees, with a standard deviation of 4.88 degrees. The sensor was integrated with a robotic jellyfish vehicle to show the viability of that type of sensor with UUV platform. Custom-built electronics were designed to split up a single input signal into 8 differing signals, allowing individual actuators to be controlled independently.

A second preferred embodiment is directed to an artificial mesoglea for a robotic jellyfish or a similar vehicle. A homogenous solution was prepared consisting of 15 wt % polyvinyl alcohol (PVA) with molecular weight of ~146,000 (Hyon et al 1989). PVA was purchased from Sigma Aldrich (St. Louis, Mo.) and combined with a mixture of 18.2 MΩ-cm water and organic solvent dimethyl sulfoxide (DMSO). Mixing ratio of water to DMSO ranged from 50:50 to 90:10 by weight. DMSO with 99.9% purity (purchased from Sigma Aldrich)

was thawed to room temperature liquid prior to use. Once PVA, water, and DMSO were combined, the solution was covered and stirred vigorously at 140° C. for two hours. After sufficient mixing, the solution was a clear gel. The gel was swiftly poured into a mold, degased in a vacuum chamber, and then placed in a −5° C. freezer for 10 hours to promote crystallization. The crystallized hydrogel was then placed in a flowing bath for 4 days, consisting of a constant supply of water to exchange DMSO in the gel with water (Hyon et. al. 1989).

Crystallinity has been found to increase with PVA concentration and freezing time, while the breakdown of the crystalline structure was seen during the thawing process (Miyazaki et al., 2002; Peppas et al., 1991). Additionally, PVA polymer with higher molecular weight was chosen because it has been found to increase crystallite size and overall phase (Mandelkern et al., 1967). Upon further examination, it was found that the synthesized structure consisted of three phases: a water phase with low PVA concentration, an amorphous phase, and a crystalline phase that restricts some of the motion of the amorphous PVA chains. Researchers have introduced organic solvents during the freezing and thawing process to promote greater crystallinity (Mansur et al. 2004). That occurs because during the freezing stage the molecular movements are restricted. The intermolecular nucleation of PVA begins at that stage with the initiation of hydrogen bonding. With the addition of the organic solvent, crystallization can proceed further because of the lowered freezing temperature and significant volume expansion. That yields a much stronger and more durable hydrogel than conventional PVA synthesis (Yokoyama et al., 1986).

Ferritin was used to form the artificial mesoglea. FIGS. 6A and 6B show a ferritin particle 600. FIG. 6A shows the elastic spring model of a ferritin (protein) shell 602 with a ferritin (iron) core 604, redrawn from (Shin et al. 2009), except shown here as embedded in a polymer matrix 608. The protein shell functions as a set of springs 610 providing restoring and expanding forces F. FIG. 6B shows a 3D rendering of the surface and cross-section of a ferritin nanoparticle redrawn from (Ohara et al. 2009).

A PVA-ferritin nanocomposite hydrogel was synthesized by using the method described above for producing PVA hydrogel. However, prior to mixing water with PVA and DMSO, 0.25 grams of undiluted stock (54 mg/mL) ferritin nanoparticles (type 1 from horse spleen) (purchased from Sigma Aldrich) was injected into 100 mL of 18.2 MΩ-cm water. The ferritin nanoparticle and water solution was sonicated for 5 minutes to ensure homogeneous dispersion. That mixture was then used in place of water in the standard PVA hydrogel preparation. PVA is a matrix for ferritin nanoparticles (FNPs) which are nanofillers. Other nanoparticles such as inorganic clays and carbon nanotube molecules have also been explored for improving the mechanical properties of hydrogels.

For comparison, the water content of natural *Aurelia aurita* jellyfish was measured. Five samples of approximately 22 mm diameter *Aurelia* jellyfish were lightly rinsed to remove excess salt water. The samples were then allowed to dry in air for 120 seconds to remove the surface water. The pre-dried weight was recorded and then the samples were exposed to light air flow under a fume hood for three days at which point the post-dry weight was recorded. After drying, salt crystals were observed on the samples, showing that the mesoglea was indeed carrying a large amount of sodium from the surrounding seawater.

The compression strength of the artificial mesoglea is an important metric of suitability to task. Compression testing was conducted on a Texture Analyzer manufactured by Stable Microsystems Ltd. The instrument was fitted with a 5 kg load cell with 0.01 N resolution. The following test method was developed by combining the guidelines from two existing ASTM standards that address compressive properties of rubbers and rigid plastics: ASTM D575—Standard Test Methods for Rubber Properties in Compression and ASTM D695—10 Standard Test Method for Compressive Properties of Rigid Plastics. Those two standards were chosen as model methods because of the polymeric nature of PVA and the rubbery similarities that silicone exhibits.

PVA and PVA-ferritin hydrogels were compressed at a rate of 12.5 mm/min (0.5±0.1 in/min) to achieve a deformation of 50% of the specimen thickness. The number 50% was chosen because naturally occurring *Aurelia aurita* has a maximum compressive deformation which does not exceed 50%. Specimens were cylindrical in shape with dimensions of 28.6±0.1 mm in diameter and 12.5±0.5 mm in thickness. All the tests were conducted in an environment of 23±2° C. and 50±6% relative humidity. Compressive forces were applied twice to condition the specimen and readings were taken during the third applied compressive force. Conditioning was performed to ensure that any internal stresses created during the hydrogel manufacturing process were accounted in the measurement. Compression platens were sufficiently larger than all specimens to ensure no material exceeded the perimeter of the platens during compression. Additionally, 400 grit waterproof sandpaper was placed on the top and bottom surfaces of the compression platens to minimize specimen slippage during compression. All silicones were compressed at a rate of 1.2 mm/min to a deformation of 98%. Video recordings and image processing in MATLAB were used to measure the true compressional surface area for calculating stress.

For comparison, the compression strength of natural mesoglea was tested. Natural mesoglea was taken from *Aurelia aurita* specimens of around 30 mm in diameter. A sample of 28.6±0.1 mm in diameter was cut from the bell. The thickness was measured in air by digital calipers. All tests were conducted in an environment of 23±2° C. and 50±6% relative humidity. The same equipment and load cell were used to test both artificial and natural mesoglea. Similar to the artificial hydrogel methods, compressive forces were applied twice to condition the specimen and readings were taken during the third applied compressive force. Once again, the compression platens were sufficiently larger than all the specimens to ensure that no material exceeded the perimeter of the platens during compression. 400 grit waterproof sandpaper was placed on the top and bottom surfaces of the compression platens to minimize the specimen slippage during compression. Specimens were compressed at a rate of 1.2 mm/min to a deformation of 98%. Video recordings and image processing in MATLAB were used to derive the true compressional surface area for calculating stress.

Figure 8:
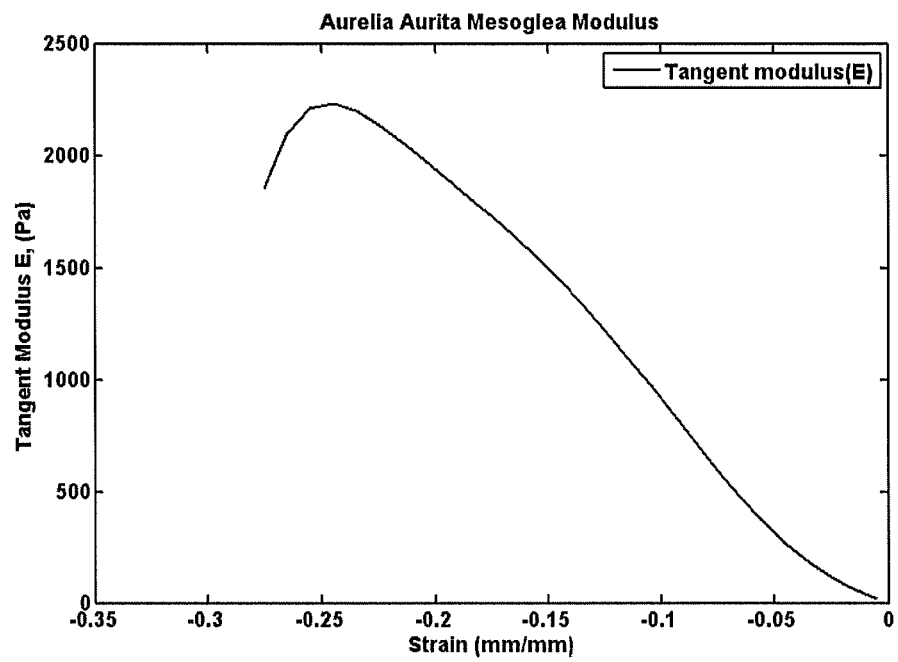
FIG. 8 is a plot of the tangent modulus of natural mesoglea as a function of strain.
Figure 9A:
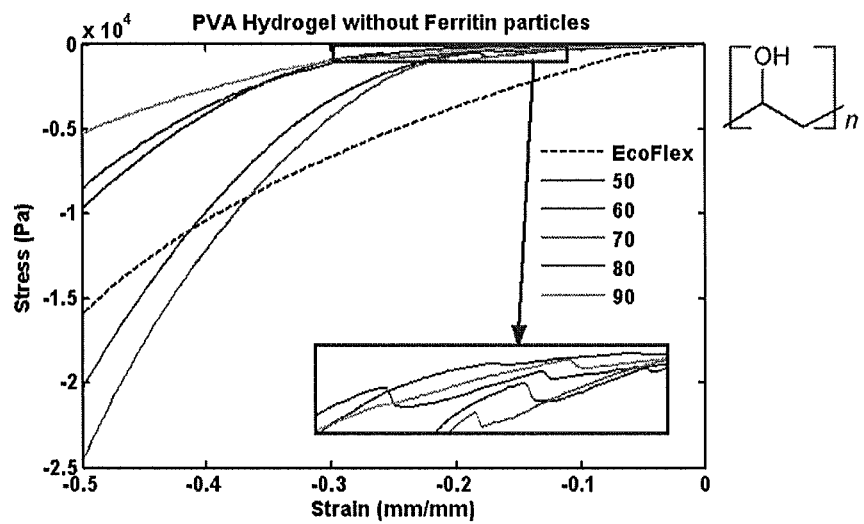
FIGS. 9A and 9B are plots of compression of polyvinyl alcohol (PVA) hydrogels of varying water content without and with ferritin nanoparticles, respectively.
Figure 9B:
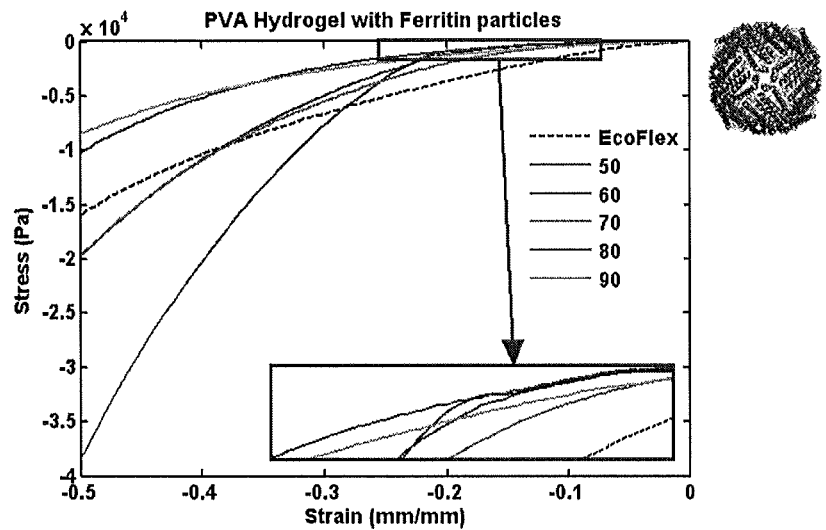

The Young's Modulus of natural *A. aurita* jellyfish mesoglea was found to be highly variable, as shown in FIG. 7. Since mesoglea stress-strain behavior is non-linear, it is not possible to represent mesoglea stiffness in terms of a single value of Young's modulus. FIG. 8 illustrates that tangent modulus $$E(\epsilon) = \frac{d\sigma}{d\epsilon}$$

as a function of strain. It suggests that initially, rate of increase of modulus is fast and starts slowing down after about ~0.1 strain. The function is fairly linear until the strain of ~0.25. Then the tangent modulus starts decreasing. i.e., material is becoming softer after initial hardening phase. At 15% strain, the tangent modulus was 1.5 kPa, which is comparable with the results reported in literature. Water was found to secrete out of the tissue during experiment which may explain why there is a gradual increase in modulus. Finally, at large strains, the structure breaks down, reducing the mesoglea stiffness. For artificial mesoglea developed here (90:10 water/DMSO PVA hydrogel with ferritin particle), the tangent modulus at 15% strain was found to be ~8 kPa. According to the results from Villanueva et al. (2010), the natural *Aurelia aurita* is expected to have a mesoglea compression of around 42% during a swimming cycle. That measurement is relative to the bell diameter in the relaxed position. Water content in the natural *Aurelia* jellyfish mesoglea was measured and was found to be 96.3% with a standard deviation of 0.57% as compared to the 85% water content of PVA-ferritin hydrogels. Compression strength of PVA hydrogel and PVA ferritin nanocomposite hydrogel for various water to DMSO ratios is shown in FIGS. 9A and 9B. The different water to DMSO mix ratios such as 90% water and 10% DMSO is denoted as the percentage of water only ("90"). All strains are shown to 50% due to the maximum compression seen in jellyfish natural mesoglea.

PVA hydrogels exhibited non-linear behavior similar to that of the natural jellyfish mesoglea. There was a wide range of stiffness value depending upon the water to DMSO ratio. Higher water to DMSO ratio lowered the stiffness of the material. The addition of FNPs was found to increase the stiffness of the hydrogel if water to DMSO ratio was held constant. The addition of FNPs also eliminated the microfailures in the hydrogel. That can be seen in the inset of FIGS. 9A and 9B.

Figure 10A:
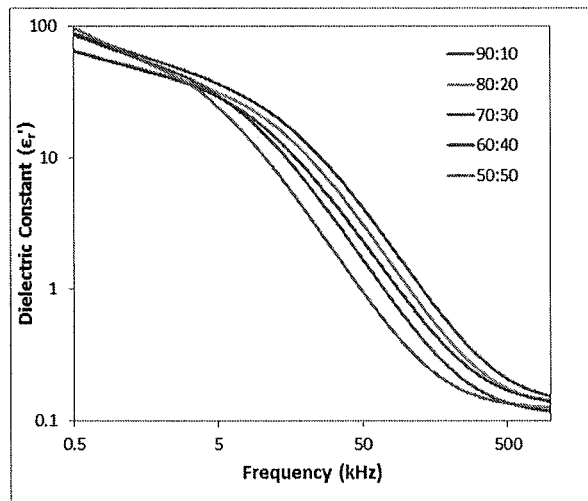
FIGS. 10A and 10B are plots of the dielectric constants of PVA hydrogels without and with ferritin nanoparticles, respectively.
Figure 10B:
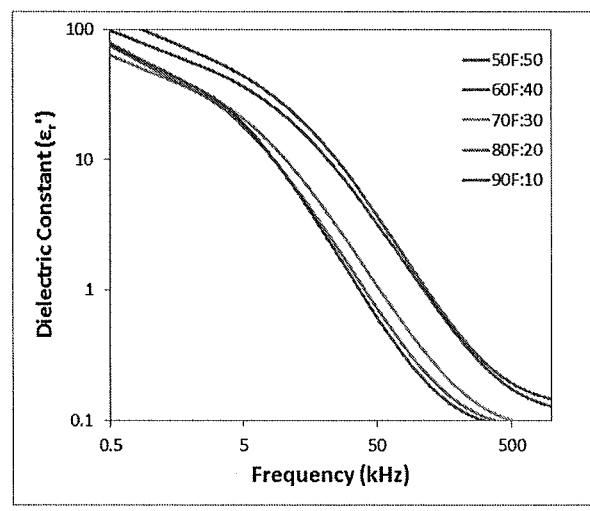

Samples of hydrogels with and without ferritin were characterized for their dielectric properties. Small samples of approximately 5.5 mm×5.5 mm×2 mm were cut from the larger blocks of hydrogel material. The small samples were allowed to dry in air for approximately 120 sec to allow excess surface moisture to evaporate. The hydrogel squares were then placed between two parallel copper plates, also of dimensions 5.5 mm×5.5 mm. Care was taken to keep the copper plates in parallel with each other. A frequency sweep of capacitance was taken with an impedance analyzer (Hewlett Packard 4274A Multi-Frequency LCR Meter) from 500 Hz to 1 MHz. FIGS. 10A and 10B are the dielectric constants of PVA hydrogel with and without FNP reinforcement respectively over ~500 kHz range. The dielectric constant for 90:10 PVA without FNPs was the highest while for PVA with FNPs 50:50 was the highest.

All hydrogels followed a clear trend of increasing optical clarity with increased DMSO content. Stiffness increases inversely with the water to DMSO ratio in PVA hydrogels with and without FNP reinforcement. In general, ferritin increased the modulus of the hydrogel, while also increasing resistance to breakage. It can be seen in the magnified region of FIG. 9A that small ruptures were encountered during testing of the hydrogels without FNP. The stress builds slightly and then rapidly decreases. In the hydrogels with FNP, that effect is greatly reduced, which can be seen in the FIG. 9B inset. The hydrogels with the highest water content begin to enter a region where they emulate the measured mechanical properties of natural *Aurelia* jellyfish mesoglea. According to the experimental data shown, PVA hydrogels with around 90% water to DMSO ratio provides a good alternative mesoglea. At 50% strain, the stress in the hydrogel is about 20% that of the Ecoflex RTV silicone. That will dramatically reduce the amount of power needed in actuators to propel an aqueous robot constructed of artificial jellyfish mesoglea. In all the experiments conducted, Ferritin was held constant (0.25 g in 100 mL).

PVA hydrogels have a stiffness between that of living jellyfish mesoglea and silicone. Outside of a water environment, jellyfish are very fragile, so that may be a desirable compromise. Megill's (2002) results yielded joint mesoglea possessing a stiffness of 130 Pa while the bell mesoglea was 352 Pa. The species he used for testing was *Polyorchis penicillatus*. Compared to an *Aurelia aurita*, the *Polyorchis penicillatus* is much smaller and uses a jetting method of swimming. *Aurelia aurita* uses a rowing mechanism for swimming and can grow up to 10 times the size of *Polyorchis penicillatus*. Also, Megill's samples were fixed before testing which most likely would have altered the material properties. Our results indicate that jellyfish mesoglea is stiffer by an order of magnitude than Megill previously reported. Additionally, PVA hydrogels, both with and without FNP, with high water to DMSO ratios can adequately match the stiffness properties of natural *Aurelia aurita*. 90/10 water to DMSO PVA hydrogel matched well with the natural material due to a similar modulus in the range of natural compression. FNPs caused the dielectric constant for the regular PVA hydrogels without FNPs to be flipped in order for PVA hydrogels with FNPs. That is most likely due to the carboxylic acid and amino groups dispersed throughout the polymer network. Water content was not varied; instead, the water to DMSO ratio was varied, which resulted in different mechanical properties. That ratio as well as water to PVA content could be varied to fine tune the properties of artificial mesoglea.

As hyperelastic materials are able to deform greatly, small deformation assumptions are no longer valid, and the local coordinate system associated with the specimen is quite different as compared to the rigid global coordinate system. Thus, instead of defining the stress-strain relationship by Young's modulus in the usual sense that is coordinate system dependent, a model that is capable of measuring strain independent of the coordinate system is needed. The standard method for representing elastic properties of hyperelastic materials is through non-linear models such as neo-hookean, Ogden or Mooney-Rivlin. We chose the 3-parameter Mooney Rivlin model to conduct a comparative analysis of artificial and natural mesoglea material. Equation (1) describes the strain energy density function W for the 3-parameter Mooney-Rivlin model, where, $c_{10}$ is the measure of initial elastic modulus (slope of the stress-strain curve), d is the compressibility parameter and is 0 for materials exhibiting incompressibility, $I_1 = \lambda_1^2 + \lambda_2^2 + \lambda_3^2$ and $$I_2 = \frac{1}{\lambda_1^2} + \frac{1}{\lambda_2^2} + \frac{1}{\lambda_3^2}$$

are strain invariants and remain independent of the co-ordinate system, $\|_1, \lambda_2, \lambda_3$ are stretches in any cartesian co-ordinate system, and J is bulk deformation. For a two-parameter model, $$G = \frac{c_{10} + c_{01}}{2}$$

is shear modulus while for higher order models, $c_{mn}$ are just coefficient of m powers of $(I_1-3)$ and n powers of $(I_2-3)$.

Table I compares the EcoFlex silicone model parameters taken from Joshi et al. (2011) with that of natural mesoglea.

$$W = c_{10}(I_1 - 3) + c_{01}(I_2 - 3) + c_{11}(I_1 - 3)(I_2 - 3) + \frac{1}{d}(J - 1)^2 \quad (1)$$

TABLE I

Mooney-Rivlin parameters for Ecoflex silicone and *Aurelia aurita* mesoglea

| Parameter | *Aurelia aurita* mesoglea | EcoFlex silicone | PVA Hydrogel with Ferritin nanoparticle (90:10 = Water/DMSO) |
|---|---|---|---|
| $c_{10}$ | 295.58 Pa | 2307.1 Pa | 1713.8 Pa |
| $c_{01}$ | −296.12 Pa | −223.76 Pa | −1217 Pa |
| $c_{11}$ | 706.47 Pa | 142.83 Pa | −227.62 Pa |
| $d$ | 0 Pa$^{-1}$ | 0 Pa$^{-1}$ | 0 Pa$^{-1}$ |

The comparison suggests that *A. aurita* mesoglea is about 7.8 times softer than Ecoflex. PVA hydrogel with ferritin nanoparticles (90% water-10% DMSO solution) was 5.8 times stiffer by comparing $c_{10}$ and thus a better material for artificial mesoglea.

In summary, a PVA based hydrogel is a promising base material for artificial mesoglea. Mechanical similarities exist between the PVA hydrogel reinforced with FNPs (a nanofiller which acts like elastic nanosprings) and biological mesoglea (a fiber reinforced tissue). Softer sections of joint mesoglea can be replicated by varying DMSO and nanofiller content to allow for folding during rowing contraction, which is seen in rowing jellyfish. Modulus pairing between artificial and natural mesoglea for specific regions is a potential topic of future research. Additionally, saltwater stability and absorption must be addressed to ensure that the outer layer does not degrade during use. The Mooney-Rivlin model suggests that PVA hydrogel with ferritin nanoparticles (90% water-10% DMSO mix) is 5.8 times stiffer compared to natural *Aurelia aurita* mesoglea, while tradionally used Ecoflex-0010 silicone was 7.8 times stiffer.

While preferred embodiments of the invention have been set forth in detail, those skilled in the art who have reviewed the present disclosure will readily appreciate that other embodiments can be realized within the scope of the present invention. For example, while the disclosed tilt sensor has a circular cavity for two-dimensional detection, different shapes, three-dimensional detection, or both could be implemented, such as a spherical cavity for three-dimensional detection. Three-dimensional detection could alternatively be achieved by having two circular tilt sensors arranged orthogonally to each other. Also, disclosures of specific numerical values or ranges are illustrative rather than limiting, as are disclosures of specific compositions. Therefore, the present invention should be construed as limited only by the appended claims.

What is claimed is:

1. A tilt sensor for sensing a tilt angle, the tilt sensor comprising:
   a conductive base plate;
   a plurality of electrical elements disposed along a peripheral edge of the base plate, the base plate and the plurality of electrical elements defining a cavity; and
   a conductive object disposed in the cavity so as to move within the cavity in accordance with the tilt angle, make contact with the base plate and a surface of the plurality of electrical elements that is substantially orthogonal to the base plate, and form an electrical connection between the base plate and at least one of the plurality of electrical elements.

2. The tilt sensor of claim 1, wherein the plurality of electrical elements comprise at least one of resistors, capacitors or resonators.

3. The tilt sensor of claim 2, wherein the plurality of electrical elements comprise resistors.

4. The tilt sensor of claim 3, wherein the resistors are connected in series and the tilt sensor is configured to receive a constant electrical input and to output an electrical output that is linearly proportional to the tilt angle.

5. The tilt sensor of claim 1, wherein the base plate is circular and the cavity is cylindrical.

6. The tilt sensor of claim 1, wherein the base plate and/or the plurality of electrical elements comprise a gold coating.

7. The tilt sensor of claim 1, wherein a resolution of the tilt sensor is proportional to a number of the electrical elements disposed along the peripheral edge of the base plate.

8. The tilt sensor of claim 1, wherein the tilt angle is an angular distance between the conductive object and a reference point and the tilt sensor is configured such that the reference point may be any point along the peripheral edge of the base plate.

9. A method for sensing a tilt angle, the method comprising:
   providing a tilt sensor comprising a conductive base plate, a plurality of electrical elements disposed along a peripheral edge of the base plate, the base plate and the plurality of electrical elements defining a cavity, and a conductive object disposed in the cavity so as to move within the cavity in accordance with the tilt angle, make contact with the base plate and a surface of the plurality of electrical elements that is substantially orthogonal to the base plate, and form an electrical connection between the base plate and at least one of the plurality of electrical elements;
   supplying the tilt sensor with an electrical input; and
   receiving an electrical output indicative of the tilt angle from the tilt sensor.

10. The method of claim 9, wherein the electrical elements comprise at least one of resistors, capacitors or resonators.

11. The method of claim 10, wherein the plurality of electrical elements comprise resistors.

12. The method of claim 11, wherein the resistors are connected in series, the electrical input is constant, and the electrical output is linearly proportional to the tilt angle.

13. The method of claim 9, wherein the base plate is circular and the cavity is cylindrical.

14. The method of claim 9, further comprising:
   coating the base plate and/or the plurality of electrical elements with gold.

15. The method of claim 9, wherein a resolution of the tilt sensor is proportional to a number of the electrical elements disposed along the peripheral edge of the base plate.

16. The method of claim 9, wherein the tilt angle is an angular distance between the conductive object and a reference point and the tilt sensor is configured such that the reference point may be any point along the peripheral edge of the base plate.

* * * * *